UNITED STATES PATENT OFFICE.

JACQUES WOTHLY, OF PARIS, FRANCE, ASSIGNOR TO JOACHIM GOULART DA SILVEIRA, OF THE UNITED STATES.

PHOTOGRAPHIC PROCESS.

Specification forming part of Letters Patent No. 49,488, dated August 15, 1865.

*To all whom it may concern:*

Be it known that I, JACQUES WOTHLY, of Paris, in the Empire of France, have invented a new and Improved Photographic Process which I term "Wothlytype;" and I hereby declare that the following is a full, clear, and exact description thereof, which will enable others skilled in the art to fully understand and make use of the same.

This invention consists in substituting in the photography for the iodides, chlorides, or bromides of silver a collodion containing uranium or a uranized collodion, so that by the reductive properties of the uranium in the light direct and distinct proofs are obtained by exposure to the light under the negative, and thereby the operation of developing the picture is saved, nothing more being required after the printing but to fix the picture in any suitable manner. For the purpose of executing this process I require a triple salt, which I prepare in the following manner: First, I dissolve the pure hydrate of oxide of uranium in nitric acid, whereby a salt is formed which is left to crystallize. The crystals are dissolved in water and precipitated by means of ammonia. The precipitate is washed, then dissolved in nitric acid, and afterward crystallized and dried. By these means a double salt is obtained which consists of nitrate of uranium and nitrate of ammonia, and which I term "uranio-nitrate of ammonia." From this I prepare a solution by taking uranio-nitrate of ammonia, twelve ounces; distilled water, six ounces; and in another vessel I prepare a solution of nitrate of silver, one-half ounce; water, one ounce; or, instead of nitrate of silver, any other salt of silver may be used which is soluble in water. These two solutions are mixed and the mixture allowed to crystallize. The crystals thus obtained compose the triple salt which I use in executing my process.

For the purpose of sensitizing the collodion I use the following solution: triple salt, three ounces; alcohol, eight ounces; nitric acid, a few drops; distilled water, one-fourth ounce; or instead of this I use the following: uranio-nitrate of ammonia, three ounces; nitrate of uranium, three ounces, the latter being refined and crystallized in eight ounces of alcohol. These sensitizing liquids may be prepared for a few months ahead, and they do not undergo any alteration or decomposition; but if so preserved they must be kept in a dark-colored glass flagon or other opaque vessel. Instead of the uranio-nitrate of ammonium all the soluble acid salts of uranium can be used for the same purpose.

For the purpose of preparing the resinous collodion I dissolve gun-cotton (three ounces) in sulphuric ether, (eight pounds,) alcohol, (four pounds,) and resin-oil, (one-fourth ounce,) and decant. This solution may also be prepared for several months ahead.

The resin-oil is composed of castor-oil, one part; Canada balm, one part, dissolved in sulphuric acid. It is afterward filtered and then allowed to evaporate in a hot-water bath till an oily substance is formed.

For the purpose of preparing the uranized collodion which I use in the preparation of photographic paper, I take from one to one and one-half ounce of either of the above sensitizing-liquids, according to the transparency of the negative, and mix it with three ounces of resinous collodion. In order to increase the sensitiveness I add a few drops of nitric acid.

In order to prepare paper for Wothly-type, I select paper which has been treated with rice-starch, wheat-starch, potato-starch, arrowroot-starch, or carrageen-starch; or, if the proper paper is not to be had in the market, I put one-half ounce of starch in one pound of water, in which a few grains of acetate of lead have been dissolved, and heat it to a temperature of about 100° Fahrenheit. I then add two ounces of albumen, free from fibrine, and with the solution thus obtained I prepare the paper in the following manner: I place the sheets upon one another on a glass plate and moisten them with the said solution, either by means of a brush or sponge, or by floating the sheets on the surface of the solution so as to have the pores and fibers filled up therewith. By causing the uranized collodion to penetrate the paper the reducing effect of the light is increased, and the pictures are brought out on the stratum covering the surface of the paper clearer and more distinct than on ordinary paper.

The sensitive paper for my process may also be produced in the following manner: I take ten pounds of albumen, and add to it four ounces of sulphuric acid with two ounces of acetic acid, while stirring or shaking continually. By the action of these acids the fibrine is separated from the albumen, and the latter is rendered fit for the operation. On the albumen thus prepared the paper is made to float from five to ten minutes, according to its thickness, and it is afterward dried in the usual manner. In order to render this paper fit to obtain proofs, I cause it to float from five to six minutes on the uranium bath, composed as follows: I dissolve in one pound of distilled water sixteen ounces of either of the above-named salts of uranium, and three-quarters of an ounce of any of the reductive agents of uranium previously named. To this mixture I add sulphuric ether, four ounces; alcohol, four ounces; nitric acid, fifty drops. When dry and prepared with chloride of silver the paper is fit for printing from a negative, and it will yield a proof like that of chloride of silver. The papers prepared by treating with uranized collodion are also intended for this bath, and produce dull proofs when allowed to float thereon for five or six minutes.

All the copies produced by the above methods are fixed and colored by the following baths:

First. Distilled water, ten pounds; acetic acid, three to four ounces; hydrochloric acid, three to four ounces; or for the water alcohol may be substituted in this solution.

Second. Water, eight pounds; hydrated sulpho-cyanide of ammonia, one-half pound.

Third. Water, eight pounds; hyposulphite of potash, one-half pound.

Fourth. Water, eight pounds; hyposulphite of ammonia, one-half pound.

Fifth. Water, eight pounds; hyposulphite of manganese, one-half pound.

Sixth. Water, eight pounds; hyposulphite of lime, one-half pound.

Seventh. Water, six pounds; hyposulphite of soda, one-half pound.

The proportion of these baths may, however, without any inconvenience, be increased or diminished, and the proofs remain on the baths from eight to ten minutes.

By the action of these baths all the combinations of the uranium formed by the ingredients in the paper are dissolved without changing the proofs, and said combinations of uranium, which are insoluble in water, must be removed from the paper to prevent the proofs from turning yellow. On being removed from the bath the proofs are put into rain or distilled water for a few minutes, and afterward washed with common water, and they are toned by dipping them into a bath composed as follows: water, four pounds; double chloride of calcium and gold, forty grains; or, instead of this double salt, sixty grains of chloride of gold, or the same quantity of oxide of ammoniacal platina, may be used. In another vessel I prepare a solution of hyposulphite of lime one pound in water, one pound, and then I mix the two solutions last named while continually shaking.

I claim—

The process above described for obtaining photographic proofs by means of photogenic substances, the preparation of which I have described, said photographic proofs being obtained, as aforesaid, without the assistance of iodide, chloride, or bromide of silver, and without development.

J. WOTHLY.

Witnesses:
 E. SHERMAN GOULD,
 DEMOS.